(12) United States Patent
Elliot

(10) Patent No.: US 12,519,419 B1
(45) Date of Patent: Jan. 6, 2026

(54) SOLAR SUPPORT STRUCTURES AND METHODS

(71) Applicant: PowerShingle, LLC, Laguna Beach, CA (US)

(72) Inventor: Jaramillo Elliot, Laguna Beach, CA (US)

(73) Assignee: PowerShingle, LLC, Laguna Beach, CA (US)

( * ) Notice: Subject to any disclaimer, the term of this patent is extended or adjusted under 35 U.S.C. 154(b) by 0 days.

(21) Appl. No.: 18/141,971

(22) Filed: May 1, 2023

Related U.S. Application Data

(60) Provisional application No. 63/337,050, filed on Apr. 29, 2022.

(51) Int. Cl.
| | | |
|---|---|---|
| *B23P 11/00* | (2006.01) |
| *H02S 20/25* | (2014.01) |
| *H02S 40/00* | (2014.01) |
| *E04D 13/04* | (2006.01) |

(52) U.S. Cl.
CPC .............. *H02S 20/25* (2014.12); *H02S 40/00* (2013.01); *E04D 13/0445* (2013.01)

(58) Field of Classification Search
CPC .... H02S 20/25; H02S 40/00; H02S 20/30–32; H02S 30/10; E04D 13/0445
See application file for complete search history.

(56) References Cited

FOREIGN PATENT DOCUMENTS

EP 1734588 A2 * 12/2006 ............... F24J 2/045

OTHER PUBLICATIONS

English translation of EP-1734588-A2 (Year: 2006).*

* cited by examiner

*Primary Examiner* — Jun S Yoo
(74) *Attorney, Agent, or Firm* — FisherBroyles, LLP

(57) ABSTRACT

A method of providing a solar support structures for shingled photovoltaic solar panel assemblies.

13 Claims, 12 Drawing Sheets

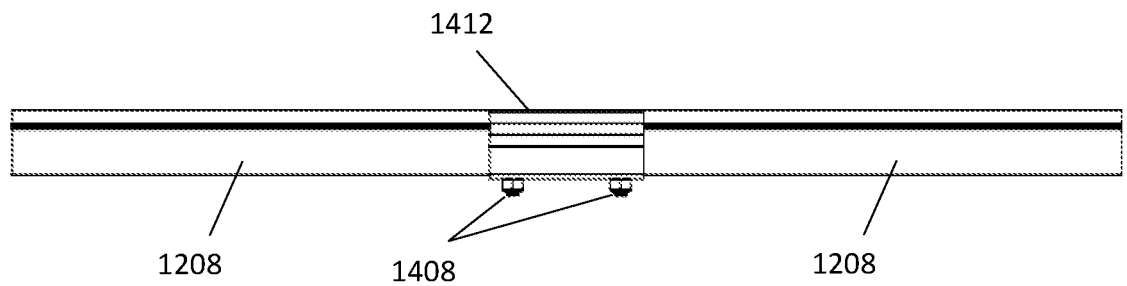
Fig. 16
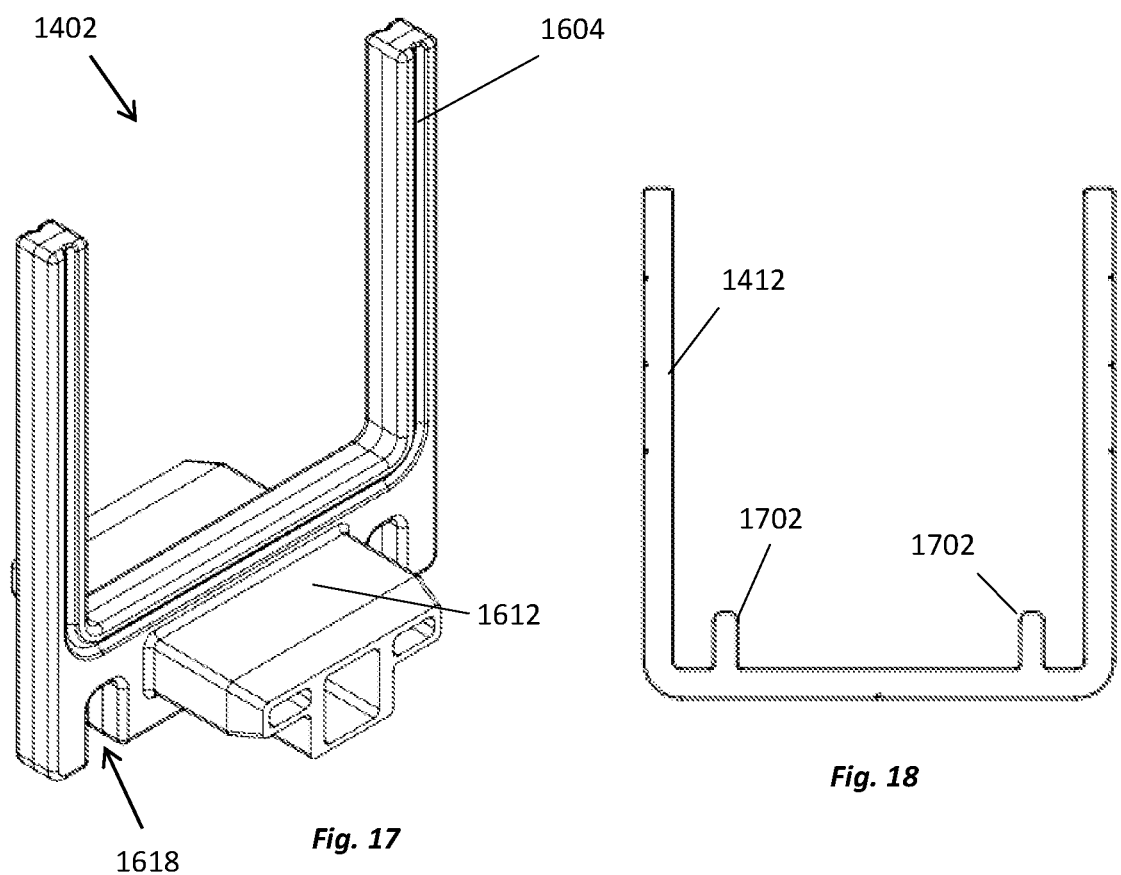
Fig. 17
Fig. 18

SOLAR SUPPORT STRUCTURES AND METHODS

Photovoltaic (PV) panels are widely used to convert solar energy to electrical power. A typical solar panel installation is comprised of a grid system employing one of many various types of structural products typically mounted on either rooftops or ground mounted applications using a variety of racking products. Additionally, over the course of the past several years, there has been a significant increase in the use solar panels mounted to elevated rack "shade" structures for the dual purpose of providing shade and protection from elements to the underlying area as well as energy production.

Regardless of solar structure-roof, ground or shade-current methods for mounting solar panels arrange the PV panels with a small gap between each panel to allow for expansion and contraction between adjacent panels. Whatever the gap dimensions specified by each panel manufacturer, any such gap is problematic whenever a watertight or near watertight solution is desired, because each gap allows water to penetrate and leak through the PV panel array. Sealing such gaps between panels in an array of multiple panels, is burdensome and difficult since adjacent panels are disposed in a common plane and typically with adjacent edges arranged together in a butt condition, as opposed to an overlapping or shingled arrangement. In such a plane environment, it may be relatively straightforward to seal two of the four edges of a (typically rectangular) PV panel system using various rails that seal gaps on two edges of each panel. However, sealing all four edges of each PV panel in an array of multiple panels is much more difficult. Exemplary methods for sealing at least two of the gaps include use of a gasket or sealant between the panels, which sealing methods degrade over time and can result in unforeseen consequences such as dirt buildup along the panel edges. Another method to seal the array is to install a sub-roof underneath the entire array of panels. However, this can result in other negative consequences, such as increased cost and construction time as well as excessive heat buildup underneath the panels and the inability to utilize a backside of the panels when bi-facial solar panels which gather light energy from both top and bottom surfaces of the panel are used.

BRIEF DESCRIPTION OF DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

FIGS. 15-21 are illustrations of splice components for channel rails in a solar panel assembly according to one embodiment.

DETAILED DESCRIPTION

Figure 1:
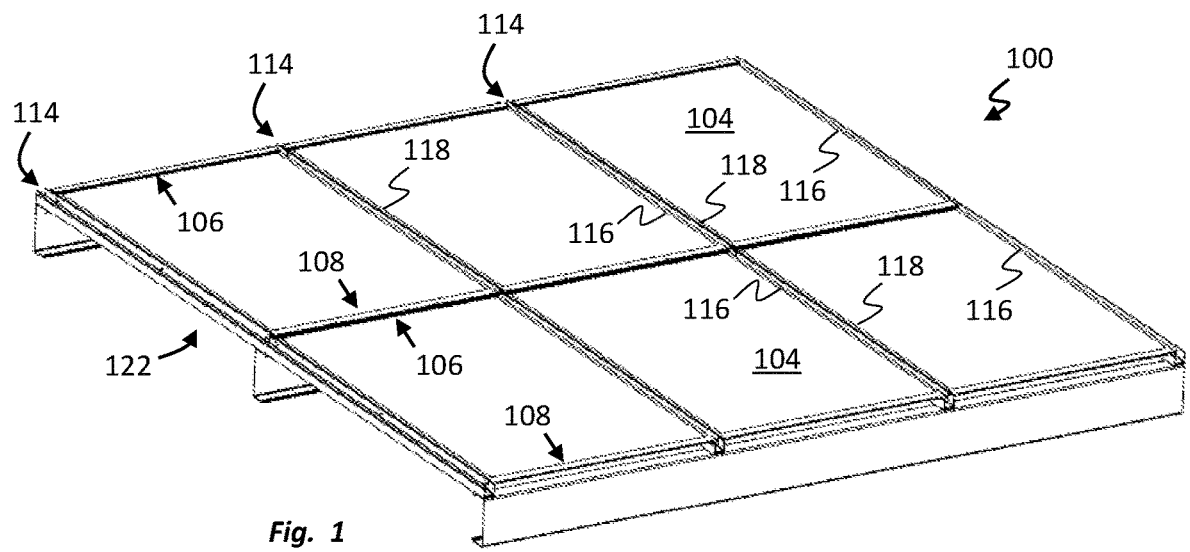
FIG. 1 is a perspective view of a solar support structure with photovoltaic panels and supports according to an aspect of the disclosure.

There are several related aspects of this disclosure. Generally, one aspect concerns modular, reconfigurable, shingled photovoltaic systems, assemblies and methods. Yet other aspects concern an easy to implement solar shingling structure providing shade or otherwise providing cover from elements including sun, rain and wind including integral paths to divert water, dust and debris while minimizing areas to collect the same. Yet other aspects concern optional systems and methods to join or splice components together while retaining desirable features of unitary components.

Disclosed systems and methods are simple, yet effective to provide shelter from elements and allow the array of PV panels to shed water with minimum or no leakage or buildup of water or dirt around any of the exposed panel edges.

Disclosed systems and methods are different than other shingle or roof systems, since the panels do not overlap or touch on all sides, but instead rely on our two-part rail system to create a channel for water runoff on the two sides between adjacent panels in the plane condition, while allowing water runoff on the other two sides of the panel due to the shingle arrangement. The channel is sufficiently deep to allow for the angle necessary to create the shingling arrangement as well as to provide sufficient material for the attachment of the shingling rail to the channel rail. A gasket and/or sealant between the panels where they overlap in the shingled arrangement prevents the edges of the shingled panels from coming into contact with each other and rattling during wind events and as well as further sealing the shingled edges of the panels to create a watertight or near watertight solution.

The disclosure can be understood more readily by reference to the following detailed description, examples, and claims, and their previous and following description. Before the present system, devices, and/or methods are disclosed and described, it is to be understood that the invention is not limited to the specific systems, devices, and/or methods disclosed, as such can, of course, vary. It is also to be understood that the terminology used herein is for the purpose of describing particular aspects only and is not intended to be limiting.

The following description is provided as an enabling teaching of the invention in its best, currently known aspect. Those skilled in the relevant art will recognize that many changes can be made to the aspects described, while still obtaining the beneficial results shown and described. It will also be apparent that some of the desired benefits can be obtained by selecting some of the features without utilizing other features. Accordingly, those who work in the art will recognize that many modifications and adaptations are possible and can even be desirable in certain circumstances and are a part of the present disclosure. Thus, the following description is provided as illustrative of certain principles and not in limitation thereof.

With reference to FIG. 1, a solar support structure 100 allows PV panels 104 to be mounted in a slightly overlapping or shingled arrangement on two opposed edges 106, 108, where edge 108 of one panel overlaps edge 106 of a neighboring panel. Exemplary structures 100 include columns of shingled panels separated by at least one channel 114 for water runoff between the panels 104 on the other two edges 116, 118 while keeping the backside 122 of the panels relatively unobstructed to accept any potential reflected light energy, which is desirable when bi-facial solar panels are used. The systems and methods employing such a solution solve multiple problems. For example, PV panels 104 are not required to be mounted in a plane and do no not result in butting conditions between any of the four edges 106, 108, 116, 118 of the PV panels and the undesirable features of such an arrangement.

Figure 2:
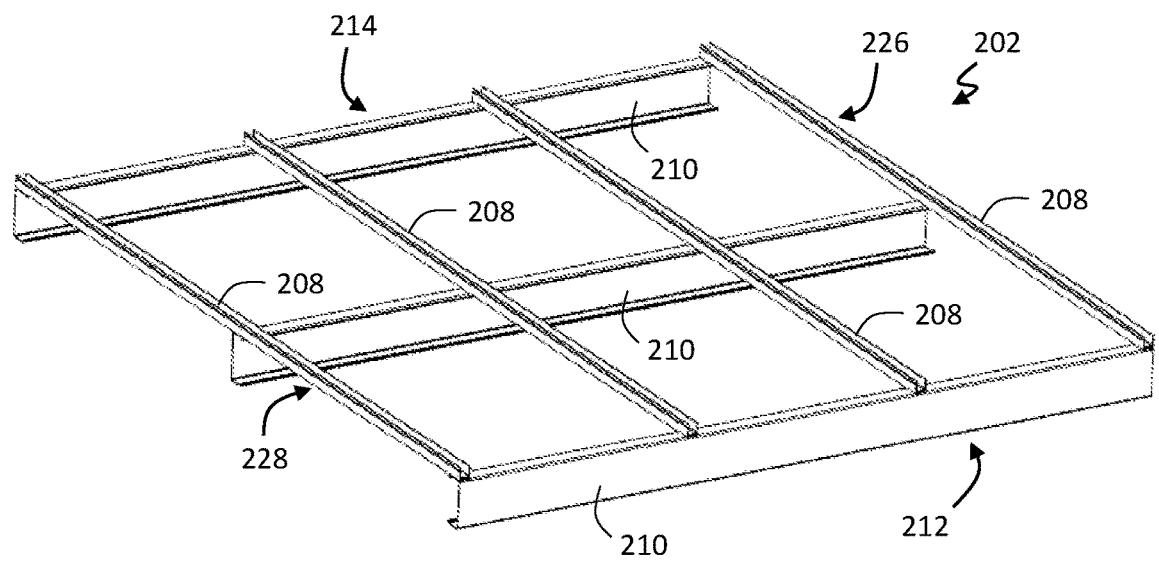
FIG. 2 is the solar support structure of FIG. 1 without photovoltaic panels.
Figure 9:
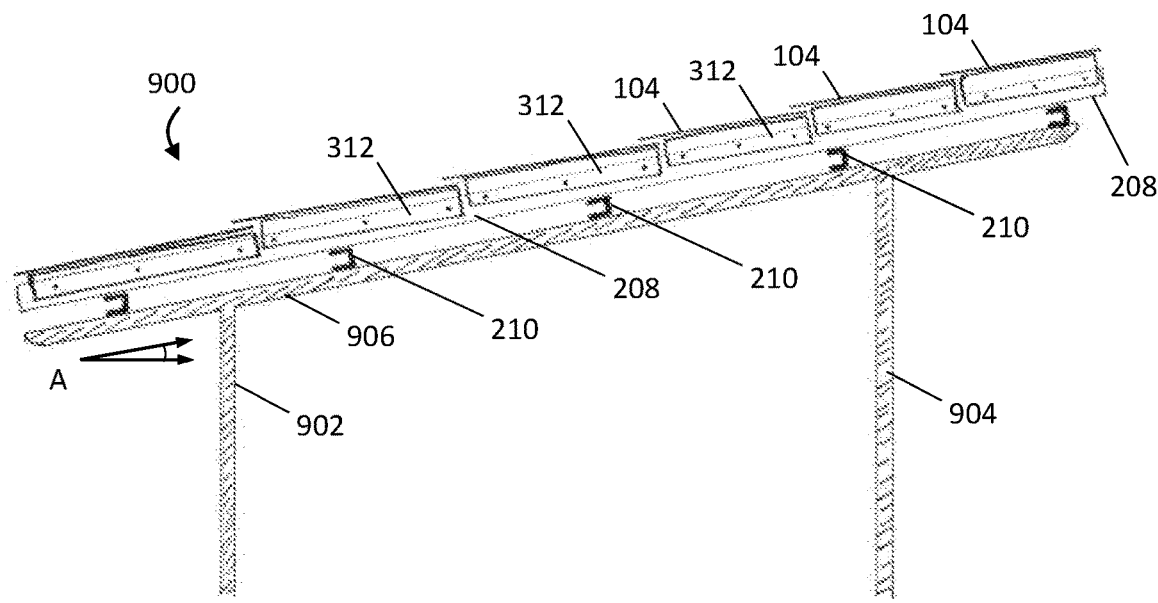
FIG. 9 is a side view of a mounted solar support structure.

As depicted by reference to FIG. 2, a structure 100 may include a two part rail framework 202 having a plurality of preferably extruded channel rails 208 connected to purlins 210 all supported above ground by an underlying support structure (FIG. 9). The structure 100 may be mounted to have first and second opposed edges, 212, 214 respectively, where one edge, for example edge 214 is disposed in an elevated position relative to the other edge, 212. Connecting the edges are sides 226, 228. As further discussed below, in one embodiment, the channel rails 208 each include a central channel that acts to direct water and debris from the structure 100. When in place, the channel rails 208 are arranged and mounted in a common plane on the framework 202.

Figure 3:
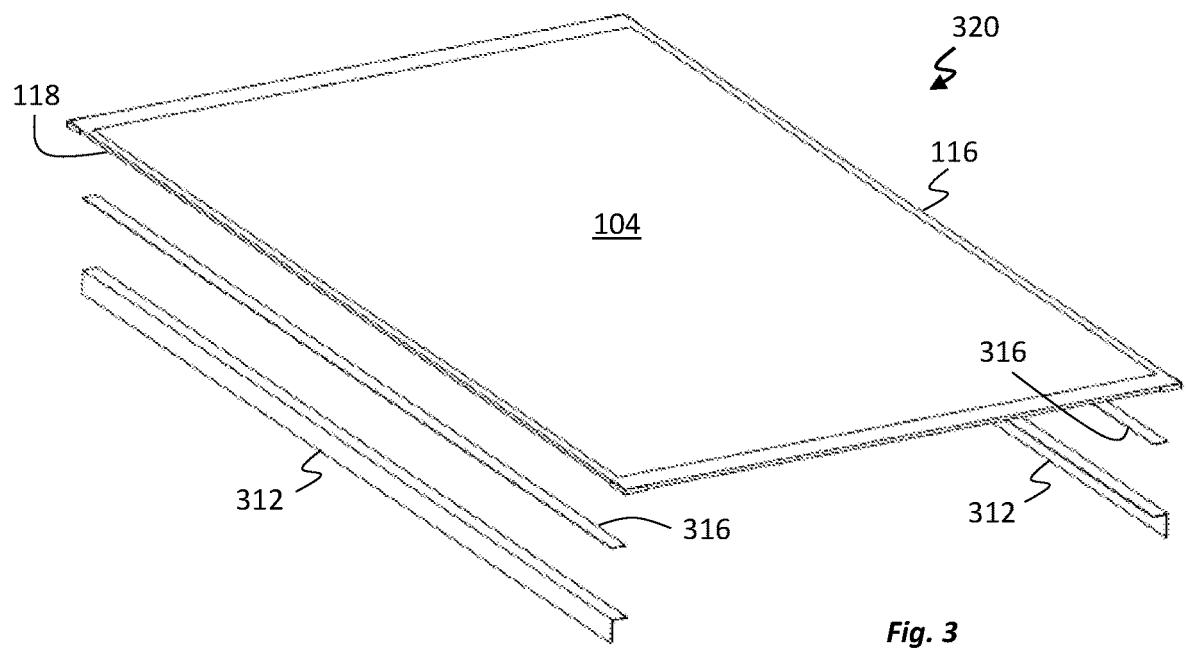
FIG. 3 is an exploded view of a photovoltaic panel assembly.
Figure 4:
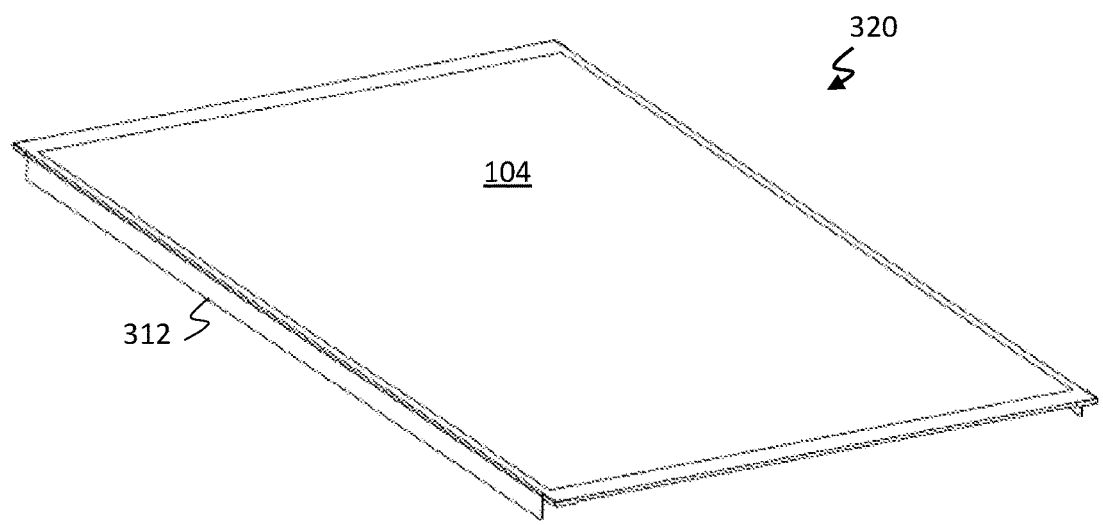
FIG. 4 is a perspective view of a photovoltaic panel assembly.

With reference now to FIGS. 3 and 4, in one embodiment, each panel 104 has shingle rails 312 that are adhered or otherwise connected to respective undersides of each PV panel 104 along the other sides 116, 118. In one embodiment, the adhesive is formed in strips 316 as depicted formed of 3M™ VHB™ tape and other suitable very high bond, structural adhesive tapes. In other embodiments, where the PV panel includes a frame around its periphery, shingle rails can include flat bar stock, such as aluminum strips, that can be adhered or mechanically affixed to the frame. In yet another embodiment, shingle rails may form formed integrally with the PV panels during manufacture by the panel supplier.

Collectively, the panels with shingle rails 312 form panel assemblies 320 to be mounted onto a framework 202 (FIG. 2). In other embodiments, modified shingle rails can include flat bar stock, such as aluminum strips, that can be adhered or mechanically affixed to a side of a photovoltaic panel having a frame or otherwise formed to accept connectors.

Figure 5:
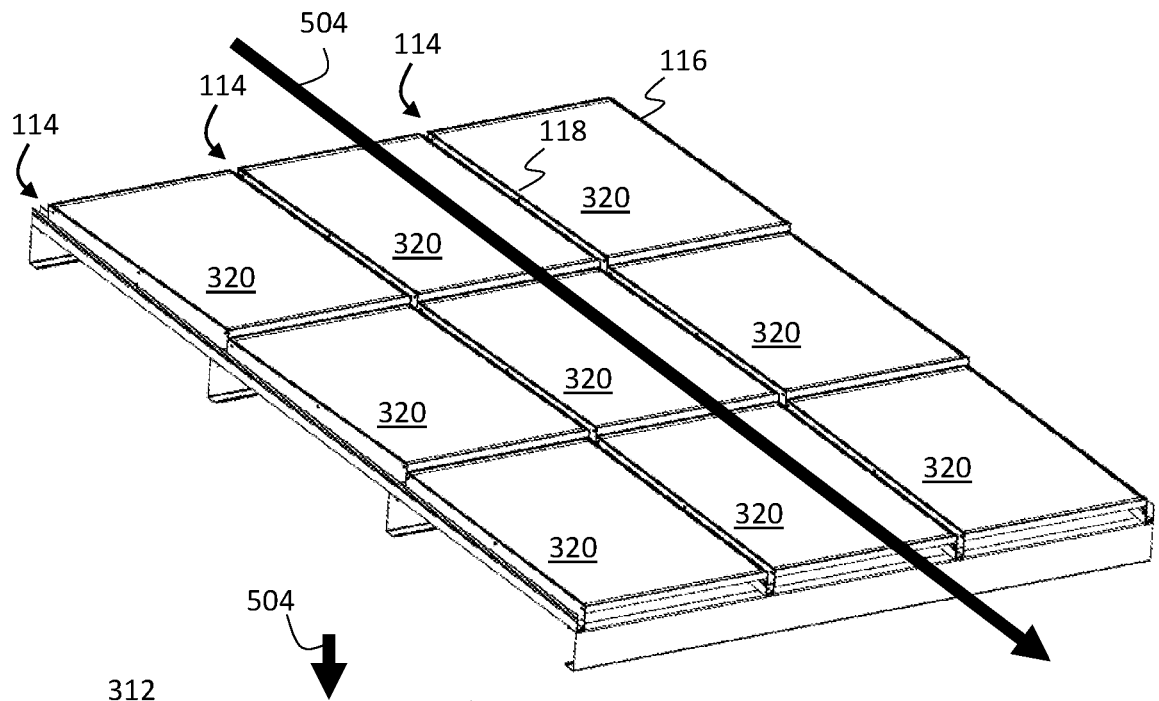
FIG. 5 is a perspective view of a solar support structure.

Referring now to FIG. 5, the panel 104 and shingle rail 312 assemblies 320 are then connected with the channel rails 208 in a fashion where a "column" indicated by arrow 504 of panel assemblies 320 are arranged so that adjacent panels 104 in a column 504 slightly overlap or shingle along two of the panel edges 106, 108. The other two panel edges 116, 118 lie adjacent to or overlie either an exterior edge 228 of the rail framework 202 or a channel 114 defined in the channel rail 208.

Figure 6:
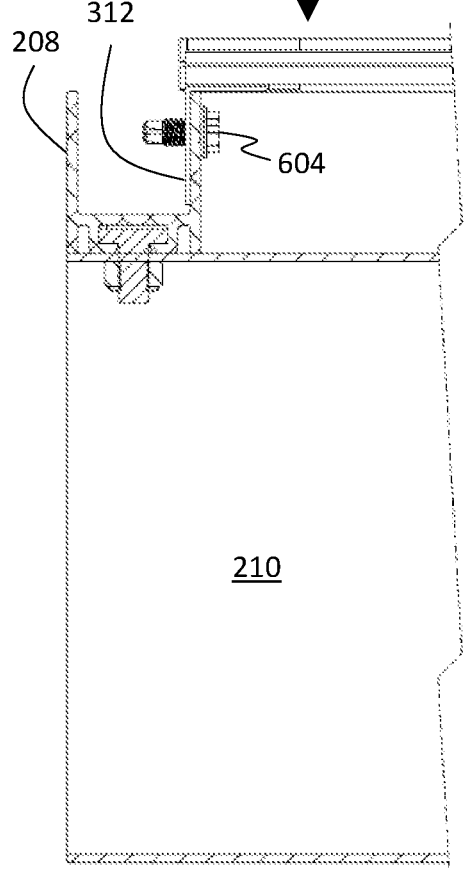
FIG. 6 is a partial cross-sectional view of an edge of a solar support structure.

With reference to FIG. 6, the shingle rails 312 are connected from beneath the rail framework 202 (FIG. 2) so that panels in a column 504 slightly overlap or shingle relative to other panels in the column 504. The shingle rail 312 connects to the channel rail 208 at appropriate locations while allowing for the angle needed to maintain a shingled arrangement to be achieved. Although screws 604 are shown, the connection mechanism is not so limited and can be made by known means.

Figure 7:
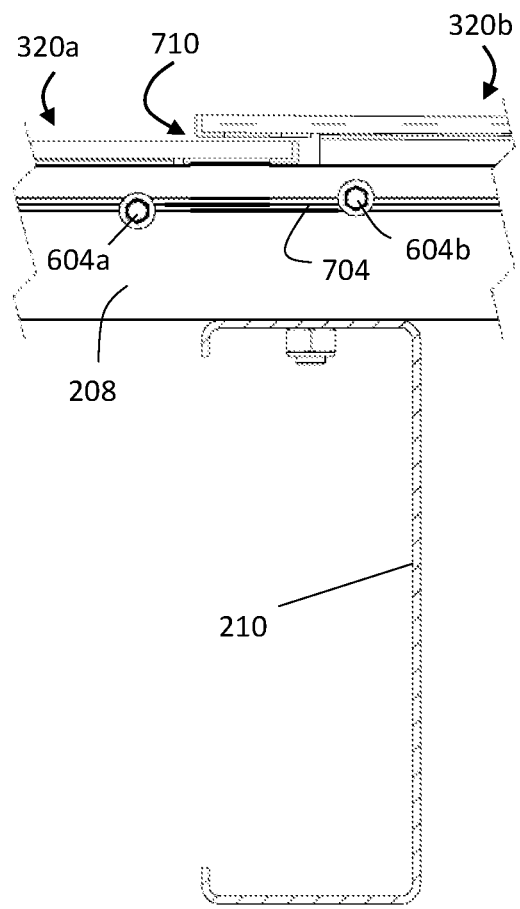
FIG. 7 is a partial side view of a pair of panel assemblies in an overlap or shingle arrangement.

Referring now to FIG. 7, a two panel assemblies 320a and 320b are shown in an enlarged, overlap or shingle orientation. As can be seen, the upper panel assembly 320b overlaps but preferably does not touch the lower panel assembly 320a. The shingle rail 312b extends into the channel rail 208 and the two are held in place by connector 604b. Guide marks 704 on the connector side of the channel rail 208 indicate approximate upper and lower connection points for connectors 604a, 604b. A gap 710 can be filled with silicone or other sealants (not shown) or by a gasket or the like. We have found that a combination of a clip and rubber gasket at the overlap aids in structural integrity, inhibits wind uplift of panel assemblies, and retards wind, dirt, dust and the like from seeping. It can now be appreciated that a roof or overhead structure may be assembled with the panel assemblies providing both the watertight cover as well as electrical power without the need of a sub-structure. Additionally, the omission of a sub-structure permits assembly of the structure by affixing the panel assemblies directly in the structure from below, preventing need to work atop the structure and on the photovoltaic panel faces. In other embodiments, shingle rails 312 span the edges of associated panels and abut or nearly abut the shingle rail 312 of the overlapped or overlapping panel. Where possible depending, for example, on panel design, the abutting shingle rails would eliminate or considerably reduce the gap illustrated while retaining the ability to assemble from beneath and provide a water tight or near watertight "roof."

Figure 8:
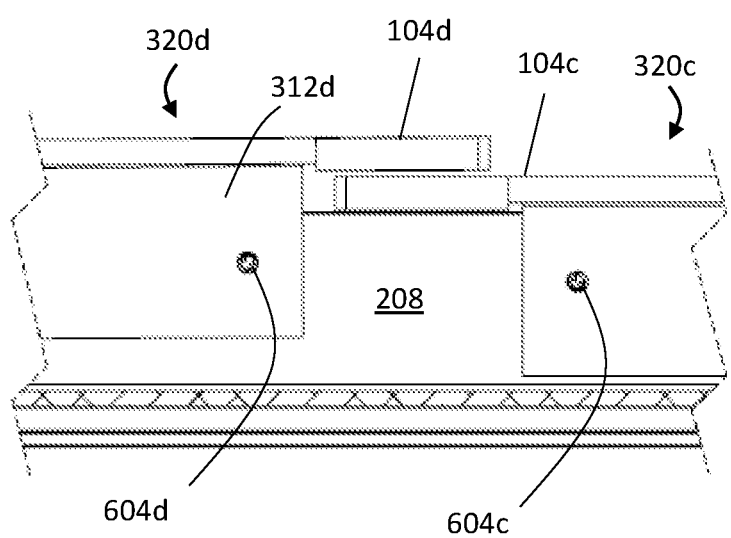
FIG. 8 is a partial side view of a pair of panel assemblies in an overlap or shingle arrangement.

Referring now to FIG. 8, overlapping panel assemblies 320c and 320d are shown to indicate the shingle rail 312d of the upper assembly 320d extends above the channel rail 208 about the thickness of a PV panel 104.

With reference now to FIG. 9, in one embodiment, a mounted solar support structure 900 includes a first support post 902 and a second support post 904 secured into or onto the ground (not shown). Spanning the first post 902 and second post 904 is a support rail 906 having a length about the same of the expected solar support structure to be mounted thereon. In the depicted arrangement, one of the support posts is taller than the other to dispose the support rail 906 at an angle A relative to the ground.

Figure 10:
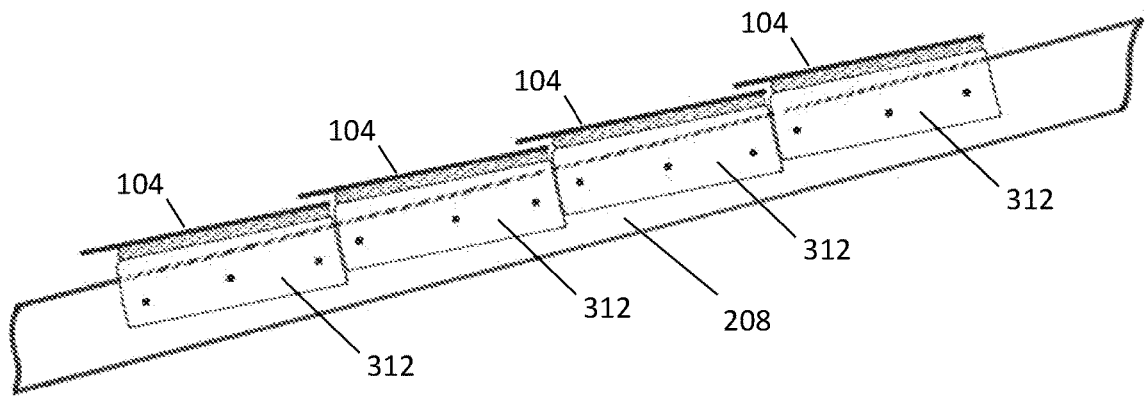
FIG. 10 is an enlarged side view of solar panel assemblies in a shingled arrangement.

With reference to FIG. 10, an enlarged detail shows the shingling rails 312 being connected to the channel rail 208 at an angle so that at least upper photovoltaic panels 104 lie out of the plane formed by tops of the channel rails. Additionally, the panels 104 lie at an angle different than angle A.

Figure 11:
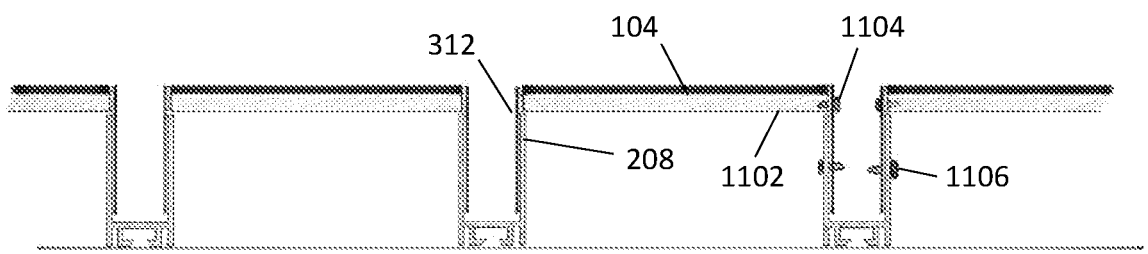
FIG. 11 an illustration of solar panel assemblies according to one embodiment.

Referring to FIG. 11, in one embodiment the photovoltaic panels 104 are surrounded by a frame 1102, typically an aluminum frame connected to and surrounding the periphery of the panel. In this embodiment, the shingling rail 312 connects to the frame 1102 illustrated by screws 1104. The shingling rail 312 is in turn connected to the channel rail 208 illustrated by screws 1106.

Figure 12:
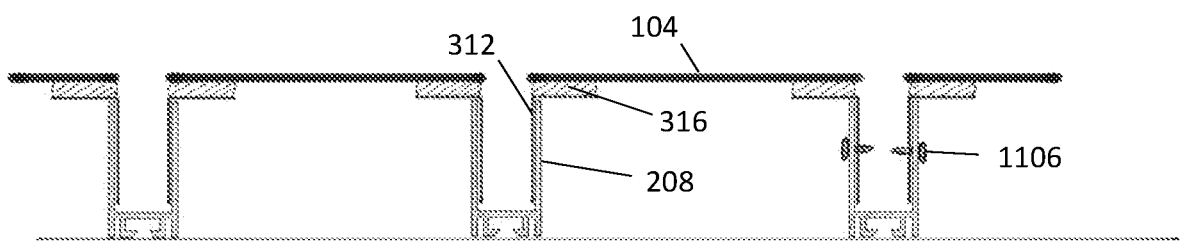
FIG. 12 an illustration of solar panel assemblies according to another embodiment.

In contrast, and with reference to FIG. 12, in an embodiment the photovoltaic panels 104 are so-called frameless panels. Here, each panel 104 has shingle rails 312 that are adhered or otherwise connected to opposed undersides of each panel 104 by an adhesive strip 316. The shingling rail 312 is in turn connected to the channel rail 208 again illustrated by screws 1106.

Figure 13:
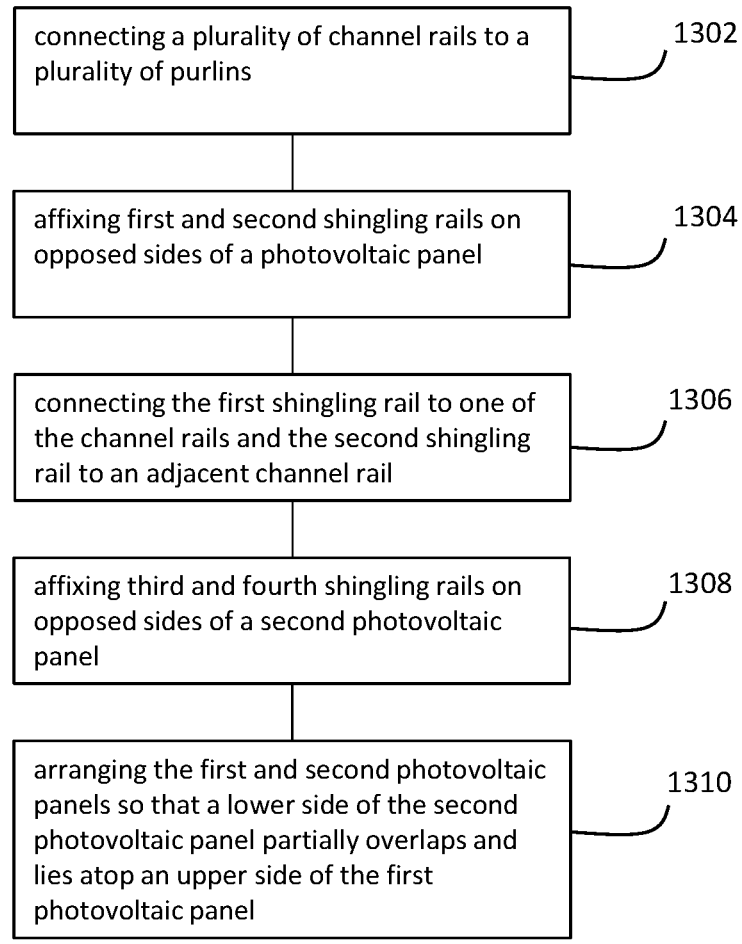
FIG. 13 depicts exemplary solar structure method steps.
Figure 14:
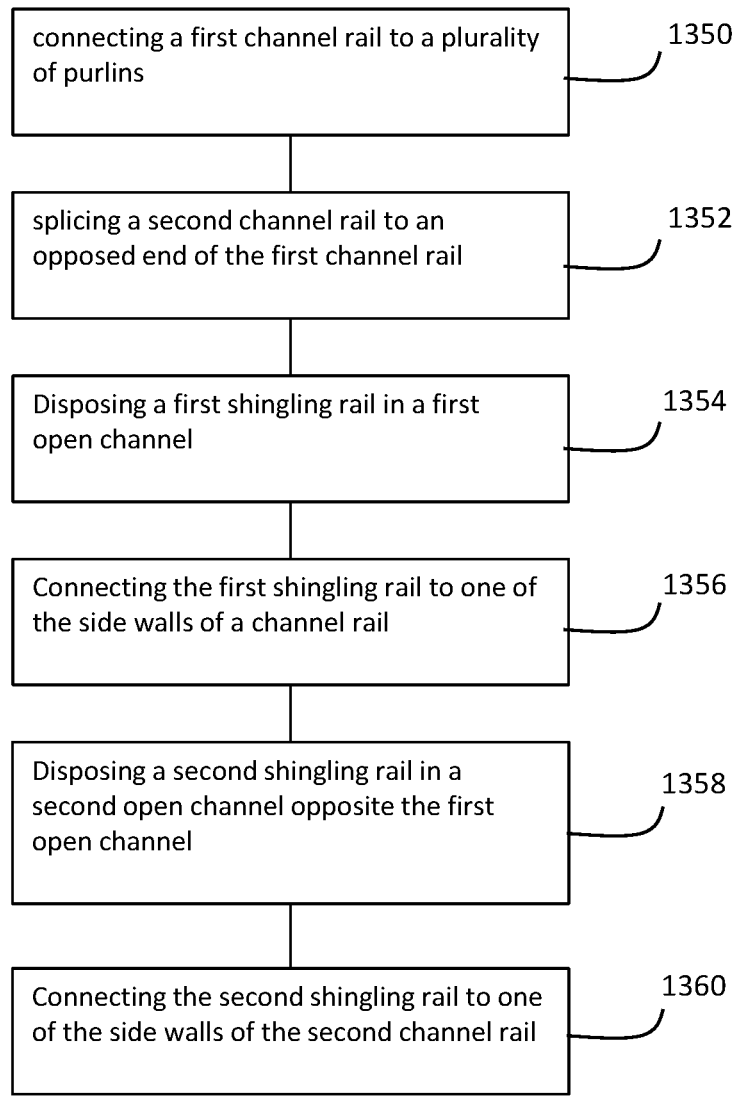
FIG. 14 depicts exemplary solar structure method steps.

Referring now to FIGS. 13 and 14, methods of assembling a solar support structure are provided. Unless noted or obviously required by sequence, the method steps are not necessarily required to be accomplished in any particular order. In one embodiment, with reference to FIG. 13, a method includes connecting a plurality of channel rails to a plurality of purlins forming a rail framework elevated such that the channel rails lie in a common plane angled relative to level 1302.

The method also includes, again, without reference to order suggested by the numbering or discussion, affixing a first shingling rail to a first side of a first photovoltaic panel and a second shingling rail to a second side of the first photovoltaic panel 1304. The method then calls for connecting the first shingling rail to one of the channel rails and connecting the second shingling rail to an adjacent one of the channel rails channel rails 1306. The method calls for affixing a third shingling rail to a side of a second photovoltaic panel and affixing a fourth shingling rail to another side of the second photovoltaic panel 1308. Continuing, the method calls for arranging the first and second photovoltaic panels so that a lower or third side of the second photovoltaic panel partially overlaps and lies atop an upper or fourth side of the first photovoltaic panel 1310. When so arranged, the second photovoltaic panel lies in a plane different than the common plane. In other words, the second photovoltaic panel is angled relative to the channel rails. The method may be repeated for several panel assemblies to form a column or a plurality of columns of partially overlapping panel assemblies.

In another embodiment, the method step of connecting 1302 includes securing the shingling rail to the channel rail from an underside of the support structure.

In another embodiment, the method further includes disposing a gasket between the first and second photovoltaic panels where the third side of the second photovoltaic panel overlaps the fourth side of the first photovoltaic panel.

In another embodiment, the method further includes connecting a clip between the first and second photovoltaic panels at a location where the second photovoltaic panel overlaps the first photovoltaic panel.

In another exemplary embodiment, with reference to FIG. 14, a method includes connecting a first channel rail to a plurality of purlins, 1350. In some cases, the channel rail is formed from a continuously formed, for example, extruded, piece. In other embodiments, one or more channel rails are spliced together, 1352.

In embodiments, a first shingling rail is disposed in a first open channel in one of the channel rails, 1354 and a second shingling rail is disposed in a second open channel opposite the first, 1358. The first and second shingling rails are connected, preferably to establish electrical continuity from the shingling rails to the channel rails, 1356, 1360. Additionally, in connected form, a lower side of the photovoltaic panel is spaced from the purlin/shingling rail plane distanced to partially overlap an upper side of a second photovoltaic panel.

Figure 15:
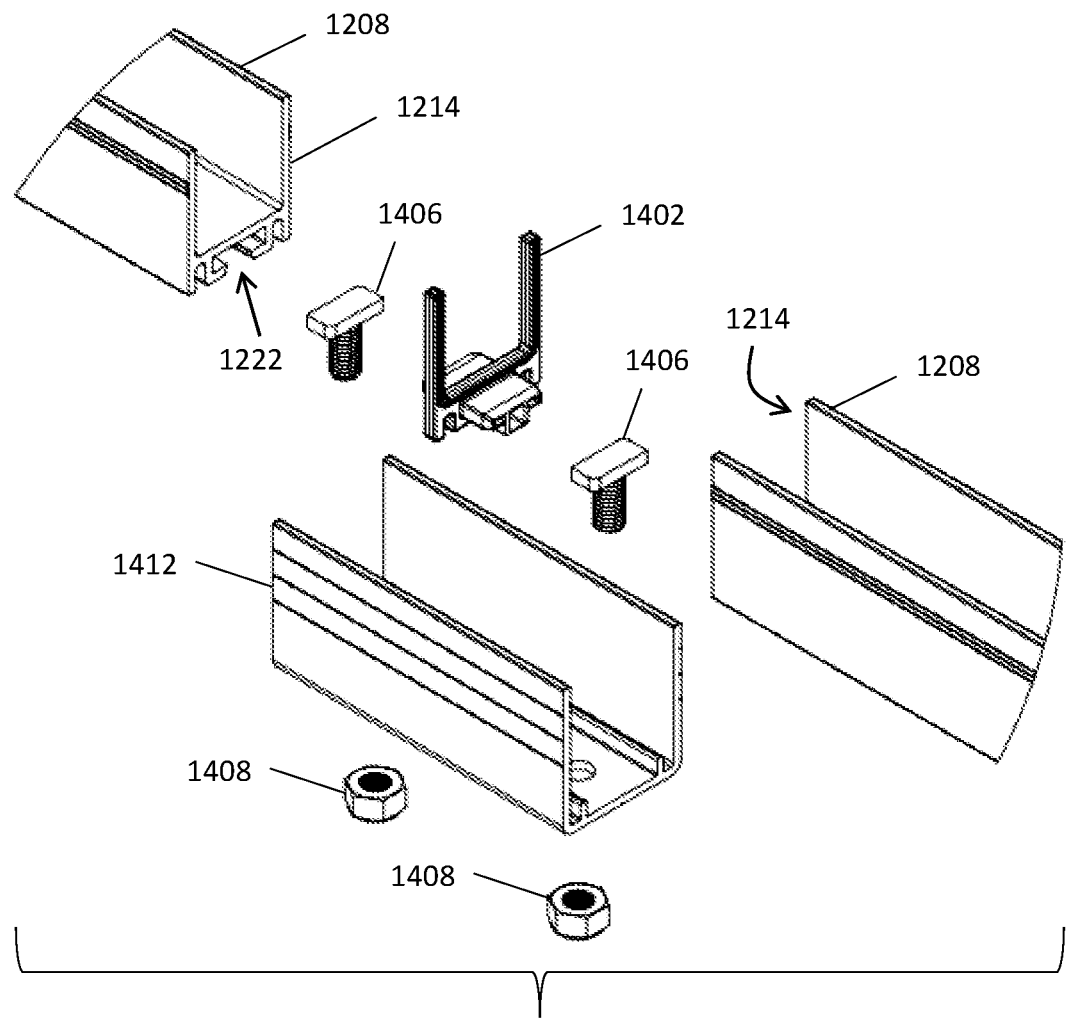

With reference now to FIG. 15, in one embodiment although it is possible to extrude the channel rail 208 in continuous lengths, it may be desirable on occasion to provide channel rails 1208 that are cut and then spliced together every to form the desired lengths. In this event, facing edges 1214 of adjoining rails may benefit from a smash gasket 1402 inserted between the facing edges 1214 and the assembly held in place by an extruded splice 1412. Smash gasket 1402 is preferably made from polymeric materials and is compressible. In the illustrated embodiment, a T-bolt 1406 is inserted into a channel 1222 and an opposed T-bolt 1406 is inserted into an opposed channel (not shown) as the channel rails 1208 are urged together compressing the smash gasket 1402 to form a water-tight or water-resistant seal held in place by tightening nuts 1408.

As can be appreciated, with reference also to FIG. 16, this arrangement provides the seal while remaining serviceable from below, and provides a method to securely connect a first and second channel rail 1208 in a straight, linear, butted condition, essentially fusing multiple shorter channel rails into one long continuous channel rail.

Referring now to FIG. 17, a smash gasket 1402 may include a U-shaped channel to correspond to the facing edges 1214 of the channel rail 1208 ends. The actual shape used is less important than that it conforms to the facing edge 1214 of the actual rail in use and forms a watertight or robust water resistant seal around the joining edges.

Continuing to refer to FIG. 17 and in connection with FIG. 18, smash gasket 1402 may optionally include voids or openings 1618 to roughly correspond with alignment rails 1702 on the interior bottom of the extruded splice 1412. In other arrangements, the voids or openings 1618 may reduced or eliminated to provide a seal over the alignment rails 1702 when the T-bolts are tightened.

Figure 19:
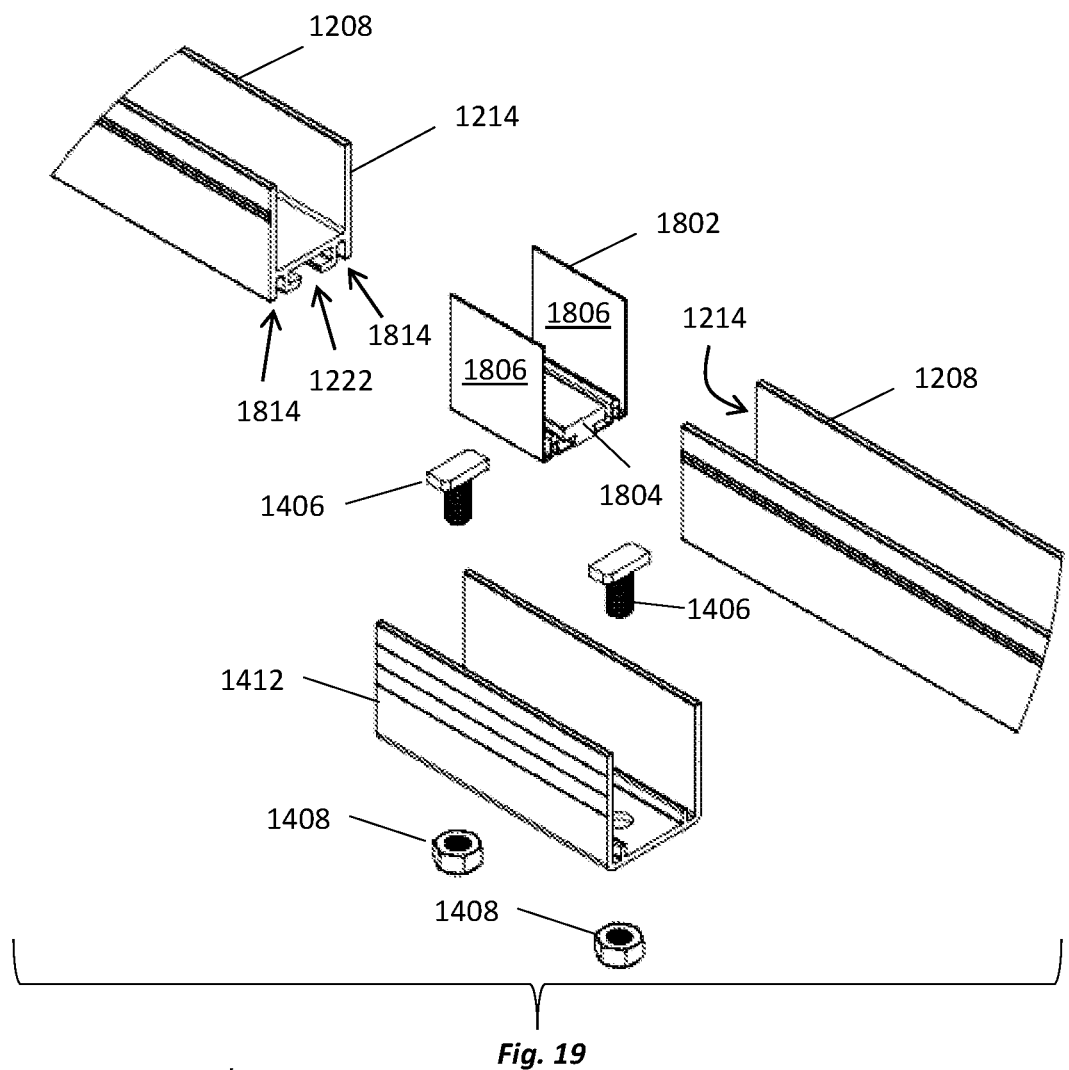

Referring now to FIG. 19, another embodiment employs a compression gasket 1802 surrounding the facing edges 1214. Compression gasket 1802, is preferably made from polymeric materials and is compressible. A portion 1804, is shaped to be received into channels 1222 on both channel rails 1208 and upward, opposed flaps 1806 surround the joint 1902 (FIG. 19) formed by the facing edges 1214.

Figure 20:
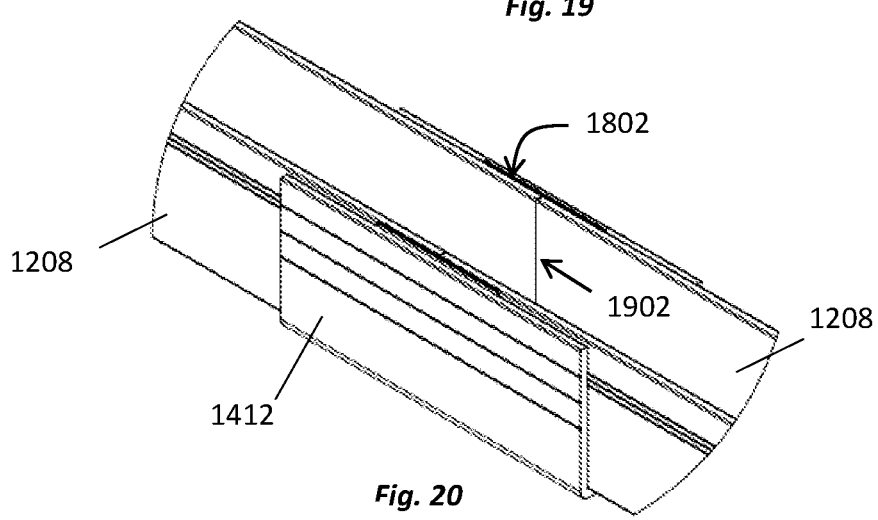

With continued reference to FIG. 19 in connection with FIG. 20, the bottom of channel rails 1208 additionally include tracks 1814 to be aligned with alignment rails 1702 where the tracks surround the channel 1222. When assembled, a T-bolt 1406 is inserted into a channel 1222 and an opposed T-bolt 1406 is inserted into an opposed channel (not shown) as the channel rails 1208 are urged together. As nuts 1408 on the T-bolts 1406 are tightened, the extruded splice 1412 compresses the compression gasket 1802 and portion 1804 seals the channel 1222.

Figure 21:
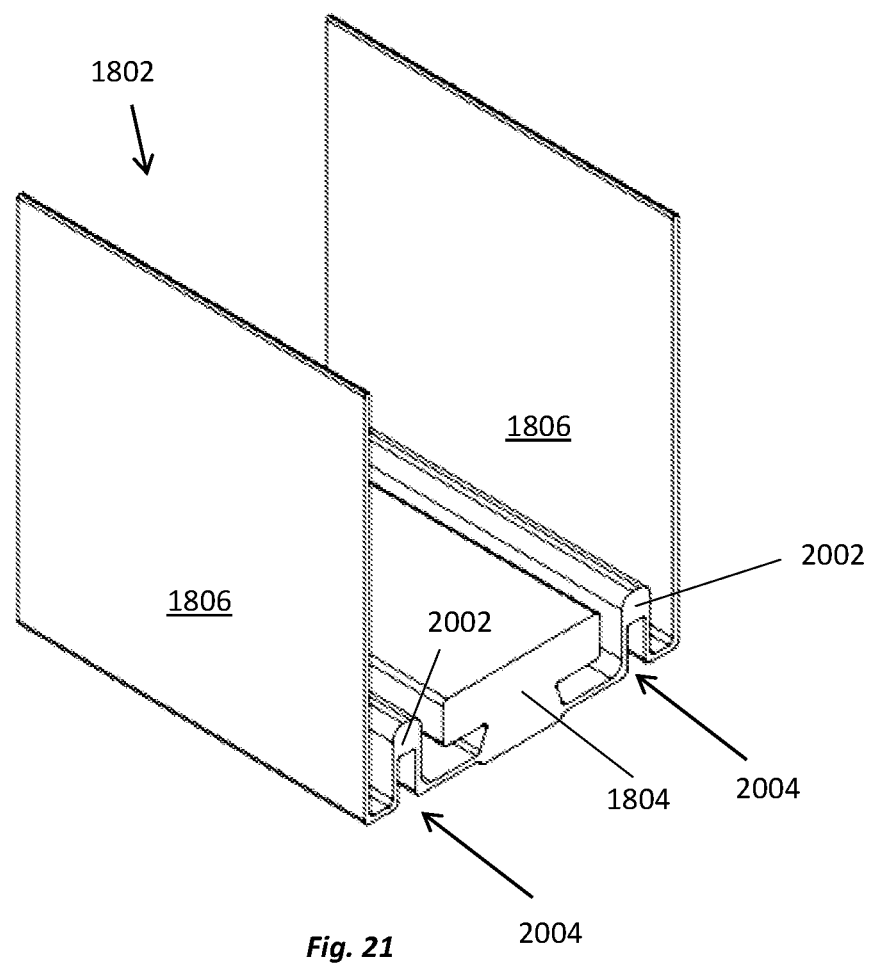

Referring to FIG. 21, an enlarged view of the compression gasket 1802 shows protrusions 2002 each having a void 2004. The protrusions 2002 are sized to sealingly conform to tracks 1814, on a lower side of the channel rails 1208 and the voids are sized to sealingly conform to alignment rails 1702, on the extruded splice 1412. Again, as nuts 1408 on the T-bolts 1406 are tightened, the extruded splice 1412 compresses the compression gasket 1802 including sealing the channel with portion 1804, and as can now be appreciated, the compression also seals tracks 1814. The resulting assembly forms a water-tight or water-resistant seal at the joint 1902.

As used herein, the singular forms "a," "an" and "the" include plural referents unless the context clearly dictates otherwise. Thus, for example, reference to an "orifice" includes aspects having two or more orifices unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Terms used herein, such as "exemplary" or "exemplified," are not meant to show preference, but rather to explain that the aspect discussed thereafter is merely one example of the aspect presented.

Additionally, as used herein, relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Although several aspects have been disclosed in the foregoing specification, it is understood by those skilled in the art that many modifications and other aspects will come to mind to artisans having the benefit of the teaching presented in the foregoing description and associated drawings. It is thus understood that the invention is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and are not intended as limiting. For example, the disclosed structures can be "stand-alone" shade structures such as car-ports, work areas, or merely to provide cover from the elements including sun and rain while at the same time providing electrical power. In other embodiments, the disclosed structures can be implemented on existing top surfaces or roofs.

As used herein, "connection" or "connected" means both directly, that is, without other intervening elements or components, and indirectly, that is, with another component or components arranged between the items identified or described as being connected. To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both." When the applicants intend to indicate "only A or B but not both" then the term "only A or B but not both" will be employed. Similarly, when the applicants intend to indicate "one and only one" of A, B or C, the applicants will employ the phrase "one and only one." Thus, use of the term "or" herein is the inclusive, and not the exclusive use. To the extent that the phrase "one or more of A, B and C" is employed herein, (e.g., storage for one or more of A, B and C) it is intended to convey the set of possibilities A, B, C, AB, AC, BC, and/or ABC (e.g., the storage may store only A, only B, only C, A&B, A&C, B&C, and/or A&B&C). It is not intended to require one of A, one of B, and one of C. When the applicants intend to indicate "at least one of A, at least one of B, and at least one of C," then the phrasing "at least one of A, at least one of B, and at least one of C" will be employed.

What is claimed is:

1. A method of assembling a structure to support an array of photovoltaic panels comprising:
    connecting a plurality of parallel channel rails atop a plurality of purlins forming a framework that lies in a plane angled relative to level where two adjacent parallel channel rails form a column on the structure, each channel rail having a "U" shape with opposed side walls joined at a bottom channel with adjacent centers of parallel channel rails spaced slightly wider than a width of a photovoltaic panel to be installed on the structure;
    splicing a second channel rail to an end of one of the plurality of parallel channel rails to extend the column with a splice located at a location of the splicing and the splice having spaced alignment rails interfacing with recesses on respective bottom portions of the spliced channel rails;
    sliding a first photovoltaic panel along the column, where the first photovoltaic panel includes shaped profiles attached to two opposed sides, with a first part of the shaped profiles attached along opposed bottom side edges of the photovoltaic panel and a second part of the shaped profiles extending away from the first part and disposed within respective adjacent parallel channel rails; and
    affixing the second part to one of the channel rail side walls such that the first photovoltaic panel lies in a non-parallel relation to the framework.

2. The method as set forth in claim 1, where the plurality of parallel channel rails further include a receiving sleeve opposite respective bottom channels and the receiving sleeve includes spaced inward facing flanges, and the splicing step includes inserting a connector held by the inward facing flanges and tightening the splice toward the connector and holding the splice to the channel rails.

3. The method as set forth in claim 2, where the splicing step includes inserting a shaped portion of a gasket, where the shaped portion is received into respective receiving sleeves.

4. The method as set forth in claim 1, where the splicing step further includes seating voids in a protrusion on a gasket onto the alignment rails in the splice.

5. The method as set forth in claim 1, further comprising connecting a clip to a lower side of the first photovoltaic panel to arrange for a partial overlap by the first photovoltaic panel over an upper side of a second photovoltaic panel.

6. The method as set forth in claim 1, further comprising connecting a clip to an upper side of a second photovoltaic panel and a lower side of the first photovoltaic panel.

7. A method of assembling a structure of photovoltaic panels comprising:
    connecting a plurality of parallel channel rails atop a plurality of purlins forming a framework that lies in a plane angled relative to level where two adjacent parallel channel rails form a column, each channel rail having a "U" shape with a bottom and opposed channel rail side walls where adjacent centers of parallel channel rails are spaced slightly wider than a width of a photovoltaic panel to be installed on the structure;
    splicing a second channel rail to an end of at least one of the plurality of parallel channel rails to extend the column with a splice component located at an interface between two of the plurality of parallel channel rails;
    sliding a first photovoltaic panel along the column, where the first photovoltaic panel includes "L" shaped profiles on a bottom of two opposed sides, with a first part of the "L" shaped profiles attached to bottom side edges of the photovoltaic panel and a second part of the "L" shaped profiles extending away from the first part to engage with respective adjacent parallel channel rails; and affixing the second parts to the channel rail side walls.

8. The method as set forth in claim 7, where the splice component includes spaced alignment rails interfacing with recesses on respective bottom portions of the spliced channel rails.

9. The method as set forth in claim 8, where the splicing step further includes seating voids in a protrusion on a gasket onto the alignment rails.

10. The method as set forth in claim 7, where the splicing step includes inserting T-bolt connectors held in a receiving sleeve on the spliced channel rails and tightening the T-bolt connectors to secure the splice component onto the spliced channel rails.

11. The method as set forth in claim 7, where the splicing step includes inserting a shaped gasket between the spliced channel rails, where at least a portion of the shaped gasket is received into a receiving sleeve on the spliced channel rails.

12. The method as set forth in claim 7, further comprising connecting a clip to a lower side of the first photovoltaic panel to arrange for a partial overlap by the first photovoltaic panel over an upper side of a second photovoltaic panel.

13. The method as set forth in claim 7, further comprising connecting a clip to an upper side of a second photovoltaic panel and a lower side of the first photovoltaic panel.

* * * * *